United States Patent [19]

Sakamoto et al.

[11] 4,310,491
[45] Jan. 12, 1982

[54] APPARATUS FOR SUPPLYING RAW LIQUID AND RELIEVING PRESSURE OF HIGH-PRESSURE PRODUCT LIQUID

[75] Inventors: Masakatsu Sakamoto, Matsudo; Kenji Uchida, Kashiwa; Yukishige Kamino, Shimoinayoshi; Makoto Saito, Minorimachi, all of Japan

[73] Assignee: Hitachi, Ltd., Tokyo, Japan

[21] Appl. No.: 239,511

[22] Filed: Mar. 2, 1981

[30] Foreign Application Priority Data

Mar. 5, 1980 [JP] Japan .................................. 55/26560

[51] Int. Cl.$^3$ ................................................ B01J 8/00
[52] U.S. Cl. .................................. 422/234; 137/210; 417/92; 422/236
[58] Field of Search ................. 422/234, 236; 423/123; 417/92, 93, 95; 137/210

[56] References Cited

U.S. PATENT DOCUMENTS

| | | | |
|---|---|---|---|
| 570,357 | 10/1896 | Waller | 417/92 |
| 2,467,413 | 4/1949 | Wildhack | 137/210 X |
| 2,761,882 | 9/1956 | Hulse et al. | 422/234 X |
| 3,306,216 | 2/1967 | Warman | 417/92 |
| 3,682,598 | 8/1972 | Kaartinen | 422/234 X |
| 3,743,444 | 7/1973 | Kazama et al. | 417/92 |
| 3,749,522 | 7/1973 | Kazama et al. | 417/92 X |
| 4,112,047 | 9/1978 | Donaldson | 423/123 |

Primary Examiner—Richard L. Chiesa
Attorney, Agent, or Firm—Craig and Antonelli

[57] ABSTRACT

An apparatus for making the supply of a material liquid and relief of pressure of a reaction product liquid in a high-pressure liquefaction reaction such as direct liquefaction of coal. The apparatus includes at least one cylinder having two working chambers separated by a movable float, one of which is adapted to receive the material liquid while the other is adapted to be charged with high-pressure product liquid. A gas discharging pipe having a valve is connected to the side of the cylinder to which the high-pressure product slurry is to be charged. For delivering the product slurry from the cylinder to the outside of the system, the pressure in the cylinder is beforehand relieved and the gases separated from the product slurry are discharged through the valve of the gas discharging pipe. Thereafter, the product slurry filling the cylinder is delivered to the outside by a low pressure of the material slurry supplied to the other side of the cylinder.

3 Claims, 2 Drawing Figures

APPARATUS FOR SUPPLYING RAW LIQUID AND RELIEVING PRESSURE OF HIGH-PRESSURE PRODUCT LIQUID

BACKGROUND OF THE INVENTION

1. Field of the Invention

The present invention relates to an apparatus for making, in a process for high-pressure liquefaction such as direct liquefaction of coal, supply of the raw material and relief of the pressure of the reaction product liquid.

2. Description of the Prior Art

Referring first to FIG. 1 illustrating a conventional process for liquefaction of coal, the material slurry in a slurry tank 1 is supplied into a high-pressure reaction vessel 3 by means of a high-pressure slurry pump 2. The slurry liquefied in the high-pressure reaction vessel 3 is discharged to the outside of the system through a reducing valve 4. The product slurry obtained as a result of the reaction is a high-pressure slurry containing product oil, unreacted coal, ash and other heavy metals.

In the conventional system, the relief of the pressure of the product slurry has been made by means of the reducing valve 4. According to this pressure relieving method, however, the gases dissolved in the slurry are separated at once to interrupt the flow of slurry, because the relief of the pressure is made abruptly while the high pressure product slurry flows continuously as a jetting flow. This inconveniently causes various problems such as a water hammering, erosion of the valve and so forth, resulting in a shortened life of the system. In addition, since the relief of pressure is made by letting the high-pressure slurry flow out through the reducing valve, the energy of the pressure is uneconomically wasted. Also, the high-pressure slurry pump 2 in this type of system has to deliver the material slurry of high concentration at a high pressure, causing various technical difficulties.

As a countermeasure for recovering the loss of pressure energy, it has been proposed to continuously feed the slurry making an efficient use of the pressure of the slurry supplied from a supply chamber to the outside of the system. This type of apparatus is shown, for example, in the specification of the U.S. Pat. No. 4,112,047.

SUMMARY OF THE INVENTION

A feature of the invention is to provide an apparatus having a cylinder for temporarily storing the liquefied reaction slurry and a gas discharge pipe provided with a valve and connected to the chamber in the cylinder for charging the high-pressure product slurry, whereby the relief of the pressure of the high-pressure product slurry and, at the same time, the discharge of the separated gas in the cylinder are achieved by means of the valve in the gas discharging pipe.

Accordingly, an object of the invention is to provide an apparatus adapted for relieving the pressure of high-pressure product slurry after the reaction, and to discharge the gases generated at the time of relieving of the pressure to the outside of the reaction system.

DESCRIPTION OF THE PREFERRED EMBODIMENTS

Figure 1:
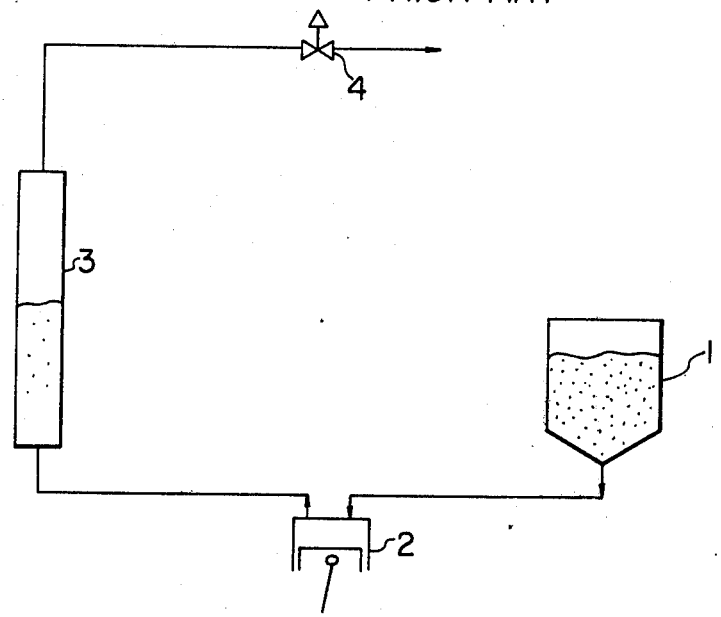
FIG. 1 is an illustration of a conventional apparatus.
Figure 2:
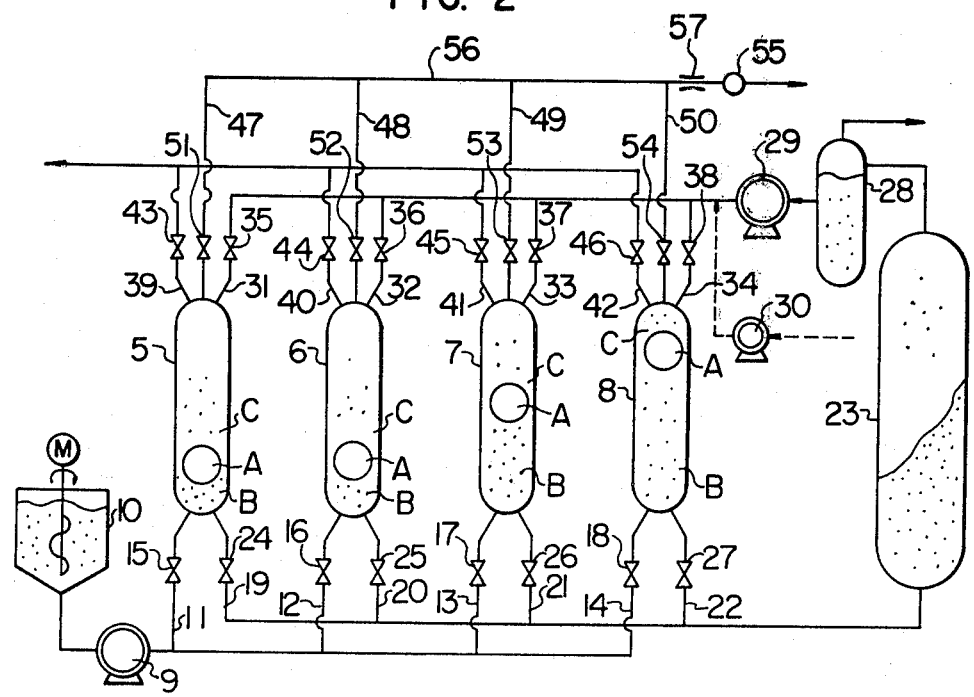
FIG. 2 is a system diagram of an apparatus of the invention.

A preferred embodiment of the invention will be described hereinunder with specific reference to FIG. 2.

The material raw slurry to be liquefied in a high-pressure liquefaction reaction such as liquefaction of coal (this material slurry will be referred to simply as "material slurry") is temporarily stopped in cylinders 5 and 8. The space in each cylinder is divided into two working chambers B, C, by means of a vertically movable float A. After a storage in a material slurry tank 10, the material slurry is introduced by a low-pressure slurry pump 9 to the cylinders 5 to 8. The material slurry introduction pipes 11 to 14 for introducing the material slurry into respective cylinders are provided with material slurry introduction valves 15 to 18. The material slurry is delivered from the cylinders to a reaction vessel 23 through delivery pipes 19 to 22 having material slurry delivery valves 24 to 27. After the reaction in the reaction vessel 23, the product slurry of the high pressure is discharged from the reaction vessel through a gas separator 28 for separating the gas from the high-pressure product slurry, and is introduced into the cylinders by means of a low-pressure pump 29 and a supply pump 30, through product slurry introduction pipes 31 to 34 having product slurry introduction valves 35 to 38. The product slurry in respective cylinders is delivered to the outside through product slurry delivery pipes 39 to 42 having respective product slurry delivery valves 43 to 46. Gas discharging pipes 47 to 50 for discharging the gases generated in the cylinders 5 to 8 are provided with pressure relief valves 51 to 54 for relieving the pressure of the product slurry. These gas discharging pipes are connected to a common gas discharging pipe 56 having a gas flow meter 55 disposed therein.

The apparatus of the invention having the construction described heretofore operates in a manner explained hereinunder. Since the cylinders 5 to 8 have the same function, the description of operation will be made as to the cylinder 8 by way of example. In FIG. 2, the float A of the cylinder 8 has been moved to the upper end of this stroke. In this state, the working chamber B has been just charged by the material slurry. After the charging of the material slurry, valves 18, 46 are closed and then the valves 27, 38 are opened. Then, the high-pressure product slurry is delivered from the high-pressure reaction vessel 23 through the gas separator 28 where the gases are separated, and is supplied to the working chamber C with the aid of the low-pressure pump 29 which compensates the pressure drop in the reaction.

Consequently, the float A is depressed downwardly, so that the material slurry in the working chamber B is forced into the high-pressure reaction vessel through the delivery pipe 22 via the delivery valve 27. The valves 27 and 38 are closed after this supply. It will be seen that the material slurry is fed into the reaction vessel by an efficient use of the high pressure possessed by the high-pressure product slurry discharged from the reaction vessel.

Thereafter, the relief valve 54 is opened to relieve the pressures in the working chambers B and C, and to discharge the gas dissolved in the high-pressure product slurry.

Since the discharged gas is restricted by the relief valve 54, the pressure in the cylinder 8 is relieved gradually so that no jetting of the product slurry take place. Thereafter, the valves 18 and 46 are opened.

Thereafter, the material slurry is charged at a low pressure in the working chamber B by means of a low pressure slurry pump 9. Since the pressure of the product slurry in the working chamber C has been relieved already, it is possible to raise the float at a sufficiently low pressure. Namely, the float A is moved upward by the pressure of the material slurry, so that the product slurry in the working chamber C is forced out of the system at a low pressure.

The above-explained operation is performed for all of the cylinders 5 to 8 in accordance with a suitable time schedule having certain time lag or phase difference between successive operations of cylinders, so that the supply of the high-pressure product slurry and the relief of the pressure of the same are conducted continuously.

In the described embodiment of this invention, however, the relief of the pressure in the cylinder is made through the relief valve, a variable reducer 57 may be disposed in a gas discharging pipe after the relief valve for restricting voluntarily discharge gas exhaust from the relief valve.

In the case of disposition the reducer 57, the relief of the pressure in the cylinder is made smoothly by adjusting the reducer 57 voluntarily.

As has been described, according to the invention, for reducing the pressure of the high-pressure product slurry charged from the reaction vessel to the cylinder to make it possible to forward the same at a low pressure to the outside of the system, the high pressure of the product slurry is relieved through the valve disposed at the same side of the cylinder as the high-pressure product slurry, and the gases separated as a result of this pressure relieving operation are discharged through the same valve. Therefore, the undesirable water hammering and erosion of valve and cylinder surfaces due to cavitation are fairly avoided to overcome the problems of the prior art.

In addition, since the pressure of the high-pressure product slurry is effectively utilized, only a low-pressure pump for compensating for the pressure drop is required to eliminate the necessity for the high-pressure pump which is essential in the conventional system.

What is claimed is:

1. An apparatus for supplying raw liquid and relieving pressure of high-pressure product liquid, comprising: at least one cylinder provided with a float dividing the space in said cylinder into two working chambers, one of said working chambers being charged with a material slurry at a low pressure, said material slurry being pressurized by the pressure of a high-pressure product slurry formed by a reaction as said high-pressure product slurry is charged into the other working chamber, the pressurized material slurry being forced into a reaction vessel and then said product slurry in the other working chamber is discharged to the outside of the apparatus, a gas discharge pipe having a valve and connected to the side of said cylinder to which said high-pressure product slurry is charged, whereby, when the product slurry charged into said cylinder is to be discharged to the outside of said apparatus, the pressure of said product slurry is relieved and the gases separated from said product slurry are discharged through said valve disposed in said gas discharging pipe.

2. An apparatus as claimed in claim 1, wherein said valve disposed in said gas discharging pipe is a relief valve adapted to relieve the high pressure of said high-pressure product slurry and to discharge the gases generated in said cylinder to the outside of said system only when said high-pressure product slurry is to be delivered to the outside of said system.

3. An apparatus as claimed in claim 1, wherein a variable reducer is disposed in said gas discharging pipe after said relief valve for restricting to reduce the discharging gas flow.

* * * * *